US006571392B1

(12) United States Patent
Zigmond et al.

(10) Patent No.: US 6,571,392 B1
(45) Date of Patent: May 27, 2003

(54) RECEIVING AN INFORMATION RESOURCE FROM THE INTERNET IF IT IS NOT RECEIVED FROM A BROADCAST CHANNEL

(75) Inventors: Daniel J. Zigmond, Carnation, WA (US); Dean J. Blackketter, San Francisco, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/295,436

(22) Filed: Apr. 20, 1999

(51) Int. Cl.[7] .............................................. H04N 7/173
(52) U.S. Cl. ......................... 725/110; 725/109; 725/134
(58) Field of Search ........................... 725/51, 109–110, 725/112–113, 134, 136

(56) References Cited

U.S. PATENT DOCUMENTS 5,528,490 A    6/1996   Hill .............................. 364/403
5,761,602 A   *   6/1998   Wagner et al. ................ 455/3.1

(List continued on next page.)

OTHER PUBLICATIONS

Electronic Industries Association EIA–746A, pre–publication Version, Revision 1, version 5, 11 pages (Apr. 26, 1998).
Electronic Industries Association EIA–516, "Joint EIA/CVCC Recommended Practice for Teletext: North American Basic Teletext Specification (NABTS)", 89 pages (May 1988).
Advanced Television Enhancement Forum Specification (ATVEF), comment draft Version 1.0, Revision 1, 19 pages (Aug. 1998).
Advanced Television Enhancement Forum Specification (ATVEF), Draft Version 1.1, Revision 19, 32 pages (Aug. 1998).
Preston Gralla, "How The Internet Works", special edition, pp. 66, 67, 142, 143, 150, 151, 260, 261, 278 and 279 (1997).
Intel Intercast website, "How Does It Work", pages from www.intercast.com, 8 pages (Jan. 29, 1999).
U.S. patent application Ser. No. 09/087,354, filed May 29, 1998.

(List continued on next page.)

Primary Examiner—John Miller
Assistant Examiner—Annan Q. Shang
(74) Attorney, Agent, or Firm—Workman, Nydegger & Seeley (57) ABSTRACT

In interactive television, information from an information resource may be displayed along with television video in a synchronized fashion. When information is to be displayed at a point in the television video, a Uniform Resource Identifier (URI) that identifies the information resource is broadcast along with the television video on a one-way broadcast communication channel. A receiver unit receives the URI from the broadcast channel. If the information resource identified by the URI is available locally (for example, is present in local storage on the receiver unit), then the receiver unit uses the URI to retrieve the information resource locally. If, on the other hand, the information resource is not available locally, then the receiver unit uses the URI to retrieve the information resource from the Internet. The information resource can therefore be received from a high speed source (for example, from VBI lines 10–20) if such reception is possible, but if such reception is not possible then the information resource can be retrieved from another source (for example, from the Internet). Once the receiver unit has retrieved the information resource, the receiver unit can display the information along with the television video.

30 Claims, 5 Drawing Sheets

U.S. PATENT DOCUMENTS

| | | | | |
|---|---|---|---|---|
| 5,774,664 | A | * 6/1998 | Hidary et al. | 395/200.48 |
| 5,818,441 | A | * 10/1998 | Throckmorton et al. | 345/328 |
| 5,832,223 | A | * 11/1998 | Hara et al. | 395/200.47 |
| 5,862,220 | A | 1/1999 | Perlman | 380/21 |
| 5,889,950 | A | * 3/1999 | Kuzma | 395/200.48 |
| 6,049,831 | A | * 4/2000 | Gardell et al. | 709/236 |
| 6,064,440 | A | * 5/2000 | Born et al. | 348/478 |
| 6,199,206 | B1 | * 3/2001 | Nishioka et al. | 725/51 |
| 6,240,555 | B1 | * 5/2001 | Shoff et al. | 725/110 |
| 6,263,505 | B1 | * 7/2001 | Walker et al. | 725/110 |

OTHER PUBLICATIONS

U.S. patent application Ser. No. 09/099,481, filed Jun. 17, 1998.

U.S. patent application Ser. No. 09/153,577, filed Sep. 15, 1998.

Electronic Industries Association EIA–746A, "Transport of Internet Uniform Resource Locator (URL) Information Using Text–2 (T–2) Service", (Sep. 1998).

Request For Comments (RFC) 791, "Internet Protocol, DARPA Internet Program Protocol Specification," Sep. 1981.

Electronic Industries Association EIA–608, "Recommended Practice for Line 21 Data Service", (Sep. 1994).

U.S. patent application Ser. No. 09/099,118, Zigmond, D., filed Jun. 17, 1998.

Advanced Television Enhancement Forum Specification (ATVEF), Version 1.1 revision 26, (Feb. 2, 1999).

R. Panabaker, S. Wegerif, and D. Zigmond, "The Transmission of IP Over the Vertical Blanking Interval of a Television Signal," (Feb. 1999).

* cited by examiner

RECEIVING AN INFORMATION RESOURCE FROM THE INTERNET IF IT IS NOT RECEIVED FROM A BROADCAST CHANNEL

BACKGROUND INFORMATION

Figure 1:
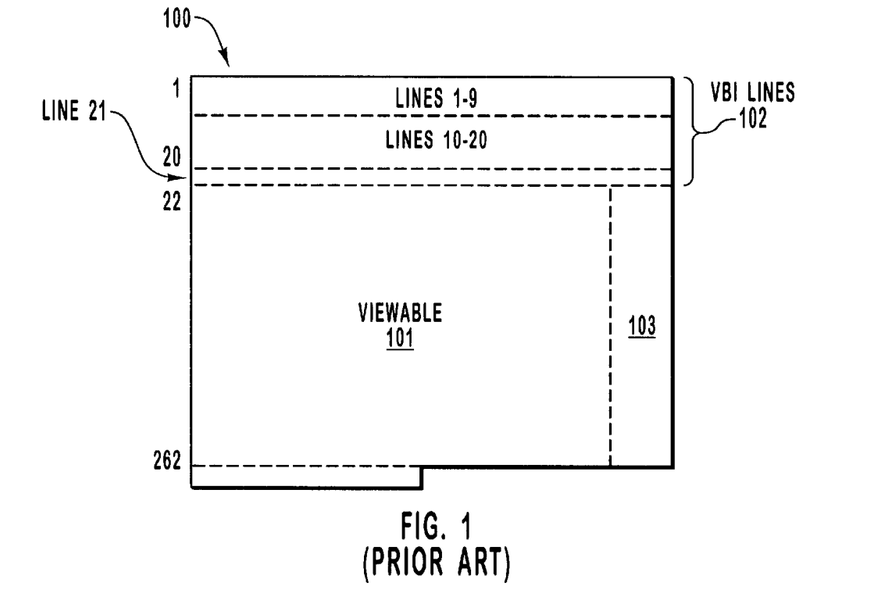
FIG. 1 (Prior Art) is a simplified diagram of a field in accordance with the NTSC standard for broadcast television.

Broadcast television in the United States is broadcast in accordance with the NTSC (National Television Standards Committee) broadcast television format standard. Approximately, thirty image frames are transmitted each second. The NTSC signal for a single frame consists of two interlaced fields of 262.5 horizontal scan lines each. FIG. 1 (Prior Art) is a simplified diagram of an NTSC field 100 having 262.5 horizontal scan lines. Only a viewable portion 101 of the field communicates the image.

Broadcast and display of field 100 is described in connection with a conventional analog television set having a cathode ray tube (CRT) with an electron beam. Receiver electronics in the television receives the broadcast NTSC signal and controls the electron beam-so that the electron beam is scanned across a screen of the CRT to form the image. The first nine horizontal scan lines 102 of the NTSC field 100 are used to synchronize the television receiver electronics and to return the electron beam to the top of the screen. The electron beam is disabled (i.e. "blanked") during the scan time of the first twenty-one scan lines so that the electron beam does not scribe a visible line from the bottom of the screen to the top of the screen when it is being returned to the top of the screen. These first twenty-one horizontal scan lines are therefore commonly referred to as the "vertical blanking interval" lines (VBI lines).

The odd scan lines of the frame (frame line 1, frame line 3, frame line 5, and so forth) are received first and in order. These odd scan lines are called the "odd field". The first twenty-one of these odd lines are VBI lines. These first lines are used, among other things, to synchronize. the television receiver for the subsequent scanning of the horizontal scan lines of the viewable portion 101. For each horizontal scan line, the electron beam in the television scans from left to right across the screen. After the beam has reached the right edge of the screen, the electron beam is returned to the left edge of the screen in preparation for the scanning of the next scan line. After the scanning of each odd scan line in viewable portion 101, the electron beam is "blanked" for an appropriate period of time so that the beam can be returned to the left edge of the screen in preparation for the next scan. The sum total of the time of these blankings is referred to as a horizontal blanking interval of the field. Region 103 of field 100 corresponds to the sum of the horizontal blanking interval times of all the scan lines.

Next, the even scan lines of the frame (frame line 2, frame line 4, frame line 6, and so forth) are received in order. As with the odd field, the first twenty-one scan lines of the even field are VBI lines. The electron beam is "blanked" during the scanning of these even VBI lines so that the electron beam can be returned to the top of the screen without scribing a line on the screen. After the scanning of the even VBI lines, the even scan lines of viewable portion 101 are then scanned in similar fashion to the scanning of the odd scan lines. The viewable horizontal scan lines of the odd and even fields together cause the electron beam to scan across the screen of the television to create the viewable television image.

The entire vertical blanking interval is generally not, however, required for vertical synchronization and vertical beam retrace. Only VBI lines 1–9 of a field are generally used for these purposes. The other twelve VBI lines 10–21 of the field are therefbre available for the communication of other information.

VBI line 21, for example, provides a low speed communication sub-channel (hereinafter referred to as the "line 21 sub-channel"). Data is encoded in the line 21 sub-channel at a data rate of two bytes per line in accordance with the encoding technique set forth in EIA-608. The Federal Communication Commission (FCC) mandates that line 21 is reserved for captioning services as specified by EIA-608. The line 21 sub-channel is in turn divided into multiple sub-sub-channels. Four of these sub-sub-channels (T1, T2, T3 and T4) are used to carry textual information. Another of these sub-sub-channels (XDS) is used to carry other information such as the current time and "V-chip" program rating codes. Four other of these sub-sub-channels (CC1, CC2, CC3 and CC4) are used to carry closed captioning information. A television receiver can capture the closed captioning information of one such sub-sub-channel and display it as a text subtitle along with the television video to assist the hearing impaired.

VBI lines 10 through 20, on the other hand, are available for a higher speed communication sub-channel for the communication of data. Data may be encoded in VBI lines 10 through 20 at a data rate of approximately thirty-six bytes per line in accordance with the NABTS (North American Basic Teletext Specification) teletext system standard set forth in EIA-516. The sub-channel of VBI lines 10–20 is therefore hereinafter referred to as the "teletext sub-channel". Due to there being eleven of these VBI lines per field, there being sixty fields per second, there being about thirty-six. bytes of data per line, there being eight bits per byte, and an error correction mechanism being employed, the teletext sub-channel has a maximum data rate of approximately 100,000 error-corrected bits per second.

It has been desired to synchronize the display of web (HTML or XML) pages to broadcast television video so that an appropriate web page can be viewed along with a predetermined part of the television video. One approach has been to broadcast web page content over the high speed teletext sub-channel. The amount of web page content is significant so the use of the high speed teletext sub-channel has been considered appropriate. After the web page content has been received, it is stored locally in the receiver under a file name for later access. Next, when the web page content is to be displayed at a particular time in the television video, a "trigger" that contains the file name of the web page content is broadcast over the teletext sub-channel. When the trigger is received, the file name of the trigger is used to retrieve the associated file containing the web page content from local storage so that the web page can be displayed.

The reception of web pages over the teletext sub-channel can, however, be somewhat unreliable. Cable television operators or local broadcast stations may use certain of VBI lines 10–20 for their own purposes, thereby interfering with the communication of web page content on these VBI lines. Moreover, televisions disposed in some geographical locations may not receive VBI lines 10–20 in a consistent fashion. If VBI lines 10–20 are not reliably received, then the web page content that was broadcast over those VBI lines will not be present in local storage and cannot be displayed. In another scenario, web page content is received over VBI lines 10–20 but the trigger to display that web page content is not. In such a situation, the web page content is present in local storage, but the web page content is not displayed due to the failure to receive the required trigger. A solution is desired.

SUMMARY

The line 21 sub-channel (VBI line 21) is subject to government regulation. Care is taken to insure that VBI line 21 and the closed captioning information it carries can be received reliably by televisions throughout most broadcast regions. The line 21 sub-channel can therefore be considered to be a relatively reliable communication sub-channel in comparison to the teletext sub-channel.

In accordance with some embodiments, a receiver unit monitors the one-way broadcast communication channel (for example, the teletext sub-channel afforded by VBI lines 10–20) for information resources such that if an information resource (for example, web page content) is successfully received by the receiver unit, then the information resource is stored in local storage in the receiver unit in association with a Uniform Resource Identifier (URI). The URI is, in one embodiment, a Uniform Resource Locator * (URL).

Web page content may, for example, be received using a tuner of a WebTV® set-top box and may then be stored in local storage (for example, on a hard disk or in semiconductor memory of the WebTV® set-top box). For additional detail on a WebTV® set-top box, see U.S. Pat. No. 6,400,407, entitled "Communicating Logical Addresses Of Resources In A Data Service Channel Of A Video Signal", issued Jun. 4, 2002, to Daniel J. Zigmond et al. (the subject matter of which is incorporated herein by reference).

When the information resource is to be used to augment the viewing of the television video (for example, when the information resource is web page content and that web page content is to displayed as a web page along with the television video), a URI (a resource identifier) is sent over the one-way broadcast communication channel. If the URI is received and the associated information resource is present in local storage, then the URI is used to retrieve the information resource from local storage. If the information resource is web page content, then the web page content can be displayed on the television screen as a web page along with the television video.

If, on the other hand, the URI is received but for some reason the associated information resource is not present in local storage (for example, the information resource was not successfully received by the receiver unit), then the URI is used to retrieve the missing information resource from the Internet. In some embodiments, the receiver unit attempts to retrieve the information resource from local storage using the URI and if the receiver unit is unable to retrieve the information resource, then the receiver unit uses the URI to retrieve the information resource from the Internet. In other embodiments, the receiver unit does not attempt to retrieve the information resource from local storage but rather determines if the information resource is present in local storage. If the receiver unit determines that the information resource is not present, then the receiver unit uses the URI to retrieve the information resource from the Internet.

After the receiver unit has retrieved the information resource from the Internet, the information resource is used to augment the viewing of the television video. If the information resource is web page content, then the web page content can be displayed as a web page along with the television video. In this way, the web page content is retrieved and displayed along with the television video even if the web page content was not successfully received over the broadcast channel.

In another embodiment, a URI is received on a receiver unit from a relatively reliable but low speed sub-channel (for example, over the VBI line 21 sub-channel) of a one-way broadcast communication channel. If an information resource (for example, web page content) identified by the URI is present on a higher speed but relatively less reliable sub-channel (for example, the higher speed teletext sub-channel afforded by VBI lines 10–20), then the receiver unit obtains the information resource from the higher speed sub-channel. If, on the other hand, the information resource is not obtained from the higher speed sub-channel (for example, because the information resource was not broadcast on the higher speed sub-channel or because the information resource was not successfully received), then the receiver unit uses the URI to retrieve the information resource from the Internet. The receiver unit therefore obtains the information resource from the broadcast channel if it is able, but otherwise retrieves the information resource from the Internet.

In another embodiment, television video from a one-way broadcast television channel is recorded onto a magnetic medium (for example, onto a VHS cassette tape). An information resource (for example, web page content) from a first sub-channel of the one-way broadcast channel is only partially recorded onto the magnetic medium (for example, due to limitations of the VHS recording process), whereas a resource identifier from a second sub-channel of the one-way broadcast channel is completely recorded onto the magnetic medium. (A resource identifier identifies an information resource. A URL identifies an information resource by specifying a location of the information resource on the World Wide Web and therefore is a particular type of resource identifier.)

When the television video is to be viewed, the magnetic medium is played back. Although all the information resource was not recorded onto the magnetic medium, the resource identifier stored on the magnetic medium is used to retrieve the information resource from the Internet. Once retrieved, the information resource is used to augment the viewing of the television video. In this way, a viewer of a VHS cassette tape can have an interactive television experience, even though all of the information resource is not recorded on the VHS cassette tape.

This summary does not purport to define the invention. The invention is defined by the claims.

DETAILED DESCRIPTION

Figure 2:
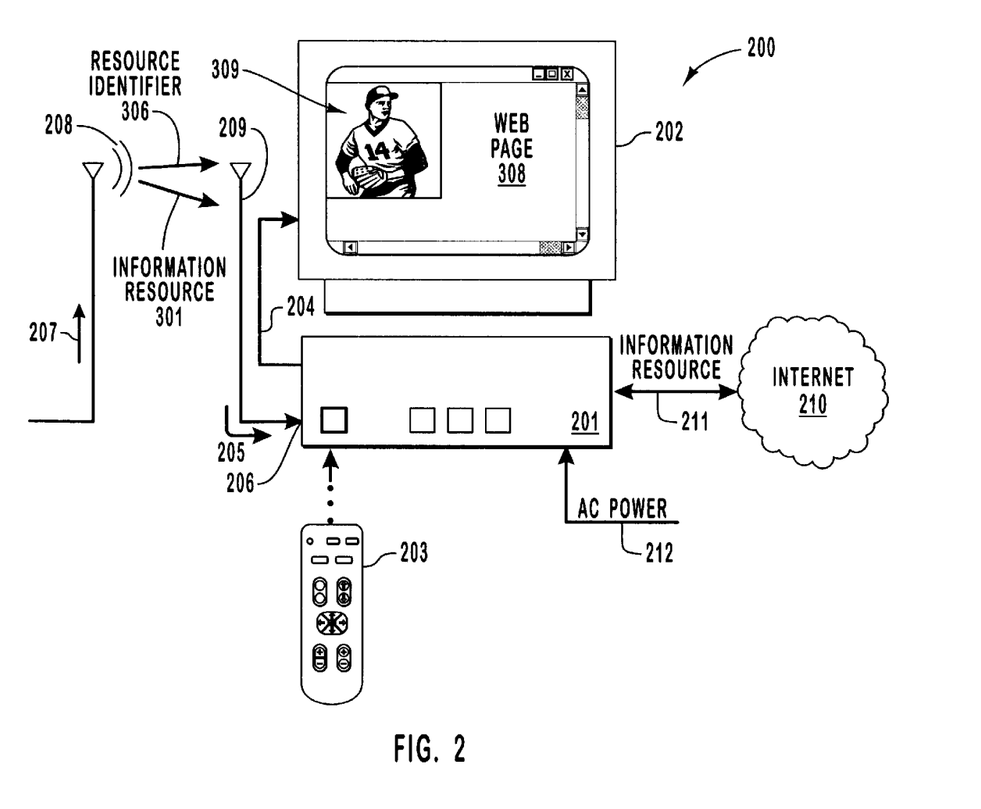
FIG. 2 is a diagram of a system 200 in accordance with an embodiment of the present invention.

FIG. 2 is a simplified diagram of system 200 in accordance with an embodiment of the present invention. System 200 includes a receiver unit 201, a television set 202, and a remote control unit 203. Receiver unit 201 uses television set 202 as a display device for displaying video and other data that is transmitted to the television set via video link 204. Although the receiver unit 201 is illustrated here as a separate unit from the television set 202, the receiver unit 201 can be built into the television set as an integral unit. Remote control unit 203 can take any one of numerous suitable forms including a hand-held remote as illustrated or a wireless keyboard that is linked to receiver unit 201 by an infrared communication link.

Receiver unit 201 receives information from a one-way broadcast communication channel. In the illustrated example, the one-way broadcast communication channel is provided by a broadcast television signal 205. A television signal 207 is broadcast as a wave through the air 208, is received on an antenna 209 as one-way broadcast signal 205, and is supplied to receiver unit 201 via input 206. One-way broadcast signal 205 need not, however, be transmitted to the receiver unit 201 as an airborne wave. One-way broadcast signal 205 may, for example, be transmitted to receiver unit 201 over any suitable transmission medium, including fiber optic links, coaxial cables, wave guides, and twin-wire transmission lines.

Receiver unit 201 is coupled to the Internet 210 via a two-way communication link 211. Two-way communication link 211 may, for example, be a POTS (plain old telephone system) connection, an Integrated Services Digital Network (ISDN) connection, a T1 connection, or a cable modem. Receiver unit 201 is powered with AC power via a power line 212. In some embodiments, receiver unit 201 is both coupled to the Internet and also receives broadcast television signals from a single cable or fiber optic link via a cable modem.

Figure 3:
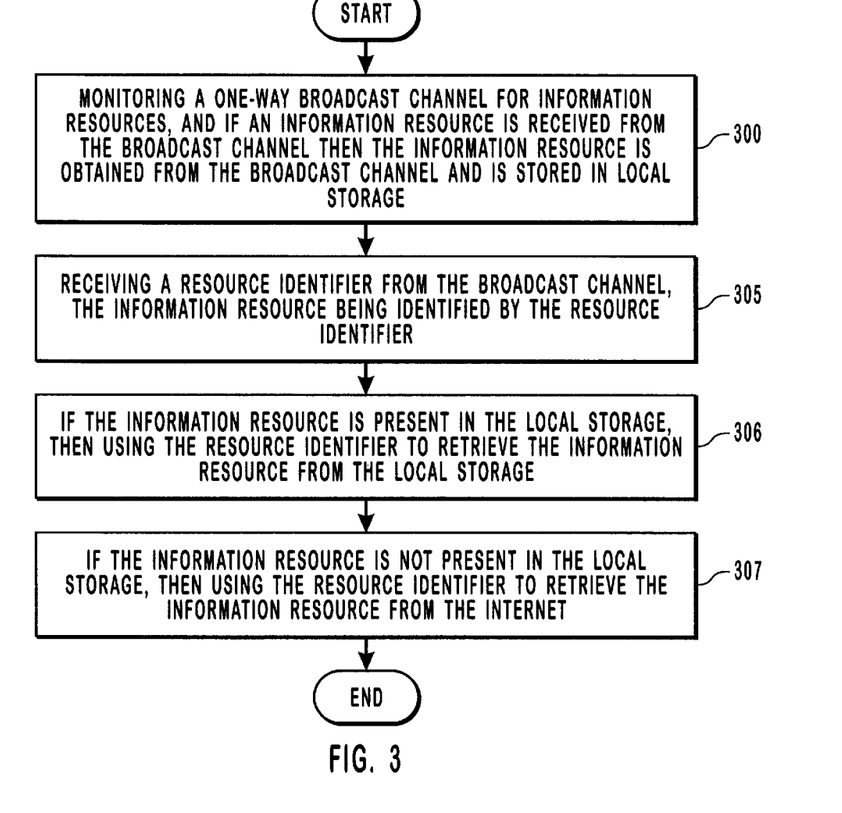
FIG. 3 is a flowchart of a method in accordance with an embodiment of the present invention.

FIG. 3 is a simplified flowchart of a method in accordance with an embodiment of the present invention. First (step 300), receiver unit 201 monitors the one-way broadcast communication channel for information resources such that if an information resource 301 (see FIG. 2) is received from the one-way broadcast communication channel, then receiver unit 201 obtains the information resource 301 from the broadcast channel and stores the information resource in local storage in receiver unit 201. The information resource 301 may, for example, be HTML (HyperText Markup Language) or XML (Extensible Markup Language) web page content that is encoded into VBI lines 10–20 of an NTSC format broadcast television channel.

Figure 4:
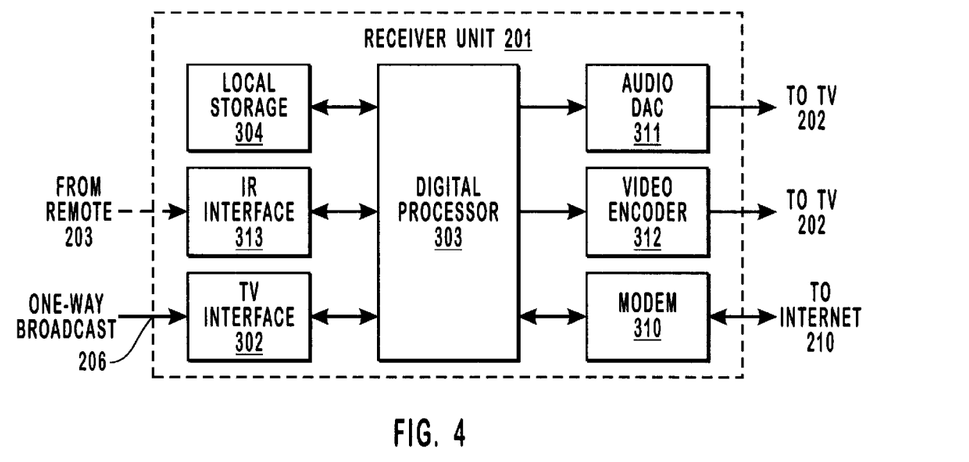
FIG. 4 is a block diagram of an embodiment of the receiver unit 201 of FIG. 2.

FIG. 4 is a block diagram of one embodiment of receiver unit 201. Information resource 301 is communicated over the one-way broadcast communication channel to TV interface circuitry 302 in receiver unit 201. TV interface circuitry 302 includes a tuner that is tuned to receive the broadcast channel signal. The tuner removes the carrier signal. After the carrier signal is removed, the TV interface circuitry 302 digitizes the signal. Software executed by a digital processor 303 receives the digitized signal from TV interface 302 and decodes and checks the digitized signal for errors thereby recovering the information resource 301. Information resource 301 is then said to have been successfully received by the receiver unit 201.

Decoding software in digital processor 303 may be realized with reference to and in accordance with: NABTS ("teletext") standard EIA-516 that describes how data is encoded in VBI lines 10–20; the IPVBI draft of February 1999 entitled "The Transmission Of IP Over The Vertical Blanking Internal Of A Television Signal" that describes how to decode IP packets from VBI lines 10–20; and the Advanced Television Enhancement Forum Specification (ATVEF) Draft Version 1.1, revision 26 specification (the content of these documents is incorporated herein by reference).

Digital processor 303 stores information resource 301 obtained from the broadcast channel in local storage 304. Local storage 304 may, for example, be semiconductor memory, (for example, random access memory (RAM)) and/or a storage disk (for example, a magnetic disk or an optical disk). In one embodiment, local storage 304 is a hard disk and information resource 301 is stored on the hard disk as a file having a filename. The filename includes a field containing a resource identifier and the resource identifier identifies information resource 301 on the Internet.

If, on the other hand, information resource 301 is not successfully received by receiver unit 201, then receiver unit 201 is unable to store the broadcast information resource 301 in local storage 304. Information resource 301 may, for example, have been transmitted over airwaves 208 but was for some reason not successfully received. Alternatively, the content provider may not have encoded the information resource 301 into the broadcast signal. In either case, information resource 301 from the broadcast signal is not stored in local storage 304.

Next (step 305), the receiver unit 201 receives a resource identifier 306 (see FIG. 2) from the broadcast channel. This resource identifier 306 identifies the information resource 301 on the Internet. In one embodiment, information resource 301 is HTML code defining a web page on the World Wide Web and resource identifier 306 is a Uniform Resource Locator (URL) that is broadcast over VBI line 21 of the NTSC format broadcast television channel in accordance with: 1) the Transport of Internet Uniform Resource Locator (URL) Information Using Text-2 (T-2) Service standard EIA-746-A; and 2) the Recommended Practice for Line 21 Data Service standard EIA-608 (the content of these two documents is incorporated herein by reference).

Of course, alternative means of uniquely identifying an information resource may be employed. For example, it is appreciated that keys (e.g. database indices), network addresses (e.g. addresses), and other identification mechanisms, alone or in combination, may be employed to uniquely identify an information resource.

Next (step 306), if information resource 301 is present in local storage 304 on receiver unit 201, then receiver unit 201 uses resource identifier 306 to retrieve the information resource 301 from local storage 304. In an embodiment where information resource 301 is stored in local storage 304 under a filename containing a URL of the information resource 301, digital processor 303 uses a URL received in step 305 to retrieve the file containing the information resource 301 from local storage 304.

If, on the other hand, information resource 301 is not stored in local storage 304 under the URI received in step 305, then digital processor 303 is unable to retrieve the information resource. Again, this may be due to the fact the information resource being transmitted was not successfully received or may be due to the information resource never having been transmitted over the broadcast channel.

Next (step 307), if information resource 301 is not present in local storage 304, then receiver unit 201 uses resource identifier 306 to retrieve information resource 301 from the Internet 210. In one embodiment, digital processor 303 includes software similar to a web browser. This software receives a URL (one type of URI) as an input and then retrieves HTML web content identified by the URL from the Internet. Digital processor 303 is coupled to the Internet via a modem 310. Modem 310 can be any suitable modem including a standard telephone modem, an ISDN modem, or a cable modem. After receiver unit 201 has retrieved the HTML web content, receiver unit 201 can display the HTML web content on the screen of the television 202 as a web page 308 concurrently with the broadcast television video.

In an example illustrated in FIG. 2, it is desired to display web page 308 along with the television video 309 (in this case a baseball game) at an appropriate time in the television video. First, an attempt is made to transmit information resource 301 (HTML web content which if displayed appears as web page 308) to the receiver unit 201 over VBI lines 10–20 of an NTSC broadcast channel. The communication channel afforded by VBI lines 10–20 is considered to be a first sub-channel of the NTSC broadcast television channel.

Information resource 301, if successfully received, is stored in receiver unit 201 in association with its URL (a URI). Then, at the appropriate time during the television video, the URI of information resource 301 is transmitted to receiver unit 201 over VBI line 21 of the NTSC broadcast channel. The communication channel afforded by VBI line 21 is considered to be a second sub-channel of the NTSC broadcast television channel. The URI is a trigger or is a part of a trigger that instructs receiver unit 201 to display the designated information resource HTML web content. Receiver unit 201 uses the URI to retrieve information resource 301 (in this case, HTML web page content) from local storage 304. In the event information resource 301 is not found in local storage 304, then receiver unit 201 uses the URI received over VBI line 21 to retrieve information resource 301 (in this case, HTML web page content) from Internet 210.

After information resource 301 (in this case, HTML web page content) has been retrieved, receiver unit 201 displays information resource 301 (such as web page 308) along with the television video 309 of the broadcast channel as illustrated in FIG. 2. Web page 308 and the television video 309 are merged into a single video stream that is transmitted to the television 202 over video line 204. Audio digital-to-analog converter (DAC) 311 and video encoder 312 convert a digital output stream from digital processor 303 into the appropriate analog audio and video signals for use by the television set 202.

If, for example, web page 308 includes a button, then a viewer can use the remote control unit 203 to click on the button. By clicking on buttons, a viewer can change television channels, customize the display of information on the television screen, interact with web pages, browse the Web, send e-mail, and/or access various system network services. Remote control unit 203 transmits infrared signals to digital processor 303 via IR interface 313.

Information resource 301 and resource identifier 306 may be transmitted to and be received by receiver unit 201 in a series of events. The first event is called the "announcement". The announcement notifies the receiver unit to prepare to receive information resource 301. The announcement may contain a time code that indicates when data is to be transmitted. The announcement also includes a list of specific IP multicast addresses that the receiver unit is to monitor and receive content from. The announcement further includes a resource identifier (for example, a name of a file where the name of the file contains a URL) that identifies a place in local storage 304 where information resource 301 should be stored.

The second event is a downloading event wherein information resource 301 is communicated to receiver unit 201 in compressed format. A downloading message is sent to the receiver to inform the receiver unit when the downloading will start. Data is transferred as a series of Unidirectional Hypertext Transfer Protocol (UHTTP) packets. Alternatively, BFTP, DSM/CC, and other protocols can be used. CRC error detection codes are included with the data so that receiver unit 201 can determine whether the data has been corrupted. An information resource may be sent multiple times so that parts of the information resource that were corrupted on the first broadcast can be received successfully on subsequent broadcasts to reconstruct the complete uncorrupted information resource. If the information resource 301 is successfully received, then the information resource 301 is stored at the location specified by the announcement.

The third event is an optional decompressing event. A decompressing message is sent to the receiver unit to inform the receiver unit that downloading is complete, that the receiver unit is to decompress the identified information resource 301 just downloaded, and that the identified information resource 301 should be decompressed by a specified time.

The fourth event is the "trigger". The trigger instructs the receiver unit 201 to use the information resource identified by a resource identifier in the trigger (for example, a file name where the information resource is stored—the file name containing a URL where the information resource can also be found on the Internet) to augment the viewing of television video. The trigger is carried in a single UDP/IP multicast packet. The trigger contains an optional expiration time field that indicates a time after which the trigger is no longer valid. The trigger also contains an optional checksum that helps detect corruption of the trigger. For additional details on announcements, one-way data downloading, checking for corrupted data, decompressing, and triggers, see: the Advanced Television Enhancement Forum Specification (ATVEF) draft version 1.1, revision 26 (the subject matter of which is incorporated herein by reference).

In accordance with one embodiment, triggers with URLs associated with large grain changes (for example, major scene changes) are broadcast in a slow speed, relatively reliable sub-channel (for example, VBI line 21), whereas triggers with URLs associated with finer grain changes (for example, changing a small part of a scene) are broadcast in a higher speed, relatively less reliable sub-channel (for example, VBI lines 10–20 ). In this way, if the higher speed relatively less reliable sub-channel is operative, then triggers for fine grain changes are received over this high speed sub-channel and an enhanced viewing experience is possible. If, on the other hand, triggers for the finer grain changes are not successfuilly received over the high speed sub-channel, viewers are nevertheless still able to receive triggers for larger grain changes over the low speed sub-channel and get the associated large grain changes from the Internet. Triggers can be selectively enabled and/or disabled in some embodiments in accordance with techniques set forth in U.S. Pat. No. 6,480,180, entitled "Enabling And/Or Disabling Selected Types Of Broadcast Triggers", issued Oct. 1, 2002, to Timothy Park et al. (the content of which is incorporated herein by reference).

In some embodiments, a trigger for a finer grain change includes a piece of a scripting language that causes a script to execute on the receiver unit. Execution of the script carries out the finer grain change by modifying a part of the web page. Execution of the script may change the HTML code for a web page so that when that HTML code is displayed by the browser of the receiver unit 201, the web page includes the finer grain change. Triggers suitable for making finer grain chnages using scripts are described in U.S. patent application Ser. No. 09/287,985, entitled "Communicating Scripts In A Data SErvice Channel Of A Video Signal", filed Apr. 7, 1999, by Dean J. Blackketter and Daniel J. Zigmond (the subject matter of which is incorporated herein by reference).

The method of FIG. 3 sees application in the high definition television (HDTV) context. In one example, resource identifier 306 is transmitted over a relatively low speed sub-channel of an HDTV channel set forth in the Closed Captioning on ATSC (Advanced Television Systems Committee) standard EIA-708, whereas information resource 301 is transmitted over a higher speed sub-channel of the HDTV channel.

Figure 5:
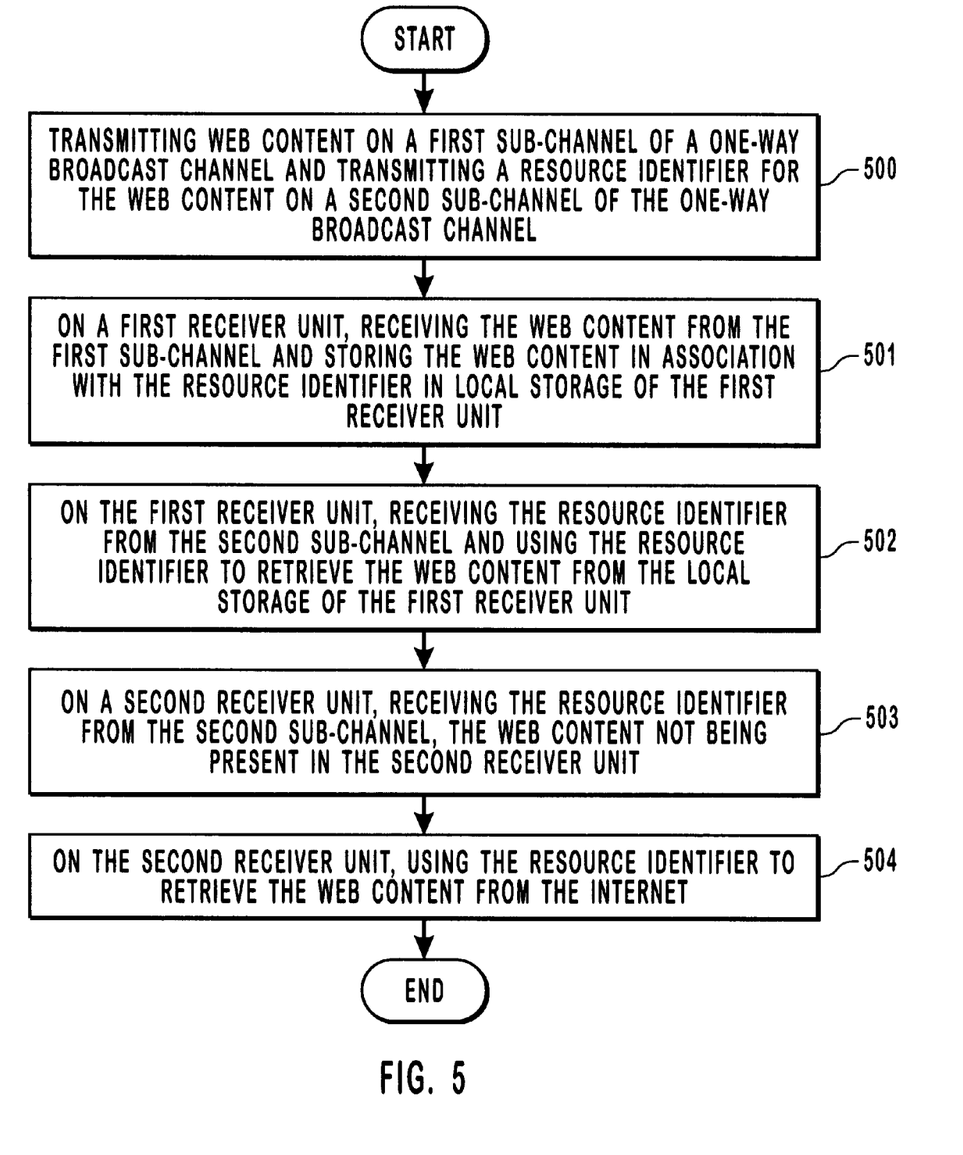
FIG. 5 is a flowchart of a method in accordance with another embodiment.

FIG. 5 is a flowchart of a method in accordance with another embodiment of the present invention. In a first step (step 500), web page content is transmitted on a first sub-channel (for example, VBI lines 10–20) of a one-way broadcast channel and a resource identifier (for example, a URL) identifying the web page content is transmitted on a second sub-channel (for example, VBI line 21) of the one-way broadcast channel. A first receiver receives (step 501) the web content from the first sub-channel and stores the web page content in local storage in association with the resource identifier. When the first receiver receives the resource identifier (for example, as part of a trigger) from the second sub-channel (step 502), the receiver unit uses the resource identifier to locate and retrieve the content from its local storage. The web page content can then be displayed as a web page along with television video from the one-way broadcast channel.

In contrast to the first receiver unit that receives the web page content from the one-way broadcast channel, a second receiver receives the web page content from the Internet. Without having received the web page content from the one-way broadcast channel and without the web page content being stored in local storage on the second receiver unit, the second receiver unit receives (step 503) the resource identifier from the second sub-channel. Because the web page content identified by the resource identifier is not present in the local storage on the second receiver unit, the second receiver cannot retrieve the web page content from its local storage. The second receiver unit therefore uses the resource identifier (for example, a URL that identifies the web page content on the World Wide Web) to retrieve the web page content from the Internet (step 504). Two receiver units that receive the same resource identifier therefore retrieve the identified web page content from different sources, one receives the web page content from the one-way broadcast channel, the other receives the web page content from the Internet.

In accordance with another embodiment, broadcast television video is recorded on a magnetic medium (for example, a VHS cassette tape). Although VHS recording aptures VBI lines 10–20 to some degree, VHS recording enerally does not capture the higher bandwidth encodings on VBI lines 10–20 well enough to pass an information resource (for example, HTML web page content) that may be encoded there. This is particularly true when the broadcast format is NABTS. In accordance with one embodiment, web page content and corresponding resource identifiers are broadcast along with television video over a one-way broadcast communication channel. The web page content is broadcast on VBI lines 10–20. The resource identifiers are broadcast on VBI line 21. The television broadcast signal is then received and recorded on a cassette tape (for example, a VHS tape). When the cassette tape is played back, the web page content from VBI lines 10–20 cannot be displayed due to the poor quality capture described above. The playback device however uses the resource identifiers from VBI line 21 to retrieve the identified web page content from the Internet. The web page content is then displayed as a web page along with the television video. The viewer can interact with the web page and have an interactive television experience by accessing the Internet as desired through the playback device.

Figure 6:
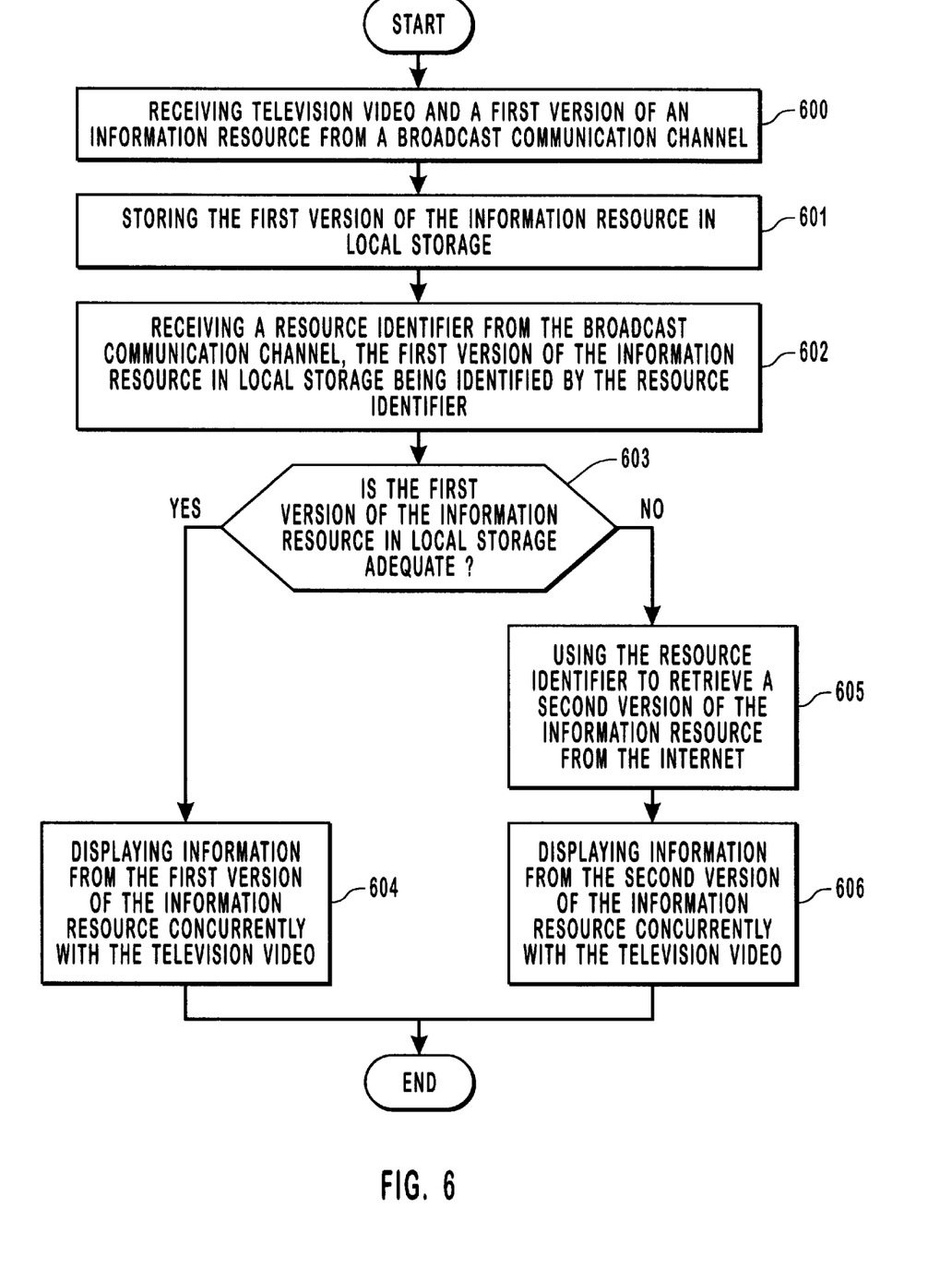
FIG. 6 is a flowchart of a method in accordance with another embodiment.

FIG. 6 is a flowchart of a method in accordance with another embodiment. First (step 600), a receiver unit receives television video and a first version of an information resource from a one-way broadcast communication channel. In one example, the information resource is received from a teletext sub-channel (VBI lines 10–20) of an NTSC television broadcast channel.

The information resource is then stored (step 601) in local storage in the receiver unit. The information resource may be stored in association with a resource identifier such that the resource identifier can later be used to retrieve the stored information resource from the local memory. An example of such a resource identifier is a URL.

The receiver unit then receives a resource identifier from the broadcast communication channel (step 602). The resource identifier identifies the first version of the information resource identifier is an interactive television trigger that contains a URL where the URL is the resource identifier. This trigger identifies an information resource where information from the information resource is to be displayed on the receiver unit.

The receiver unit then determines (step 603) whether the first version of the information resource present in local storage is adequate. This determination can be made in any one of numerous different ways using numerous different types of information depending on the particular application. In one particular embodiment, the information resource is a web page complete with an http header that was used to transport the web page. An expiration date stamp is contained in the meta-information in the http header. The receiver unit uses the resource identifier to retrieve the first version of the information resource from local memory and examines this expiration date stamp. If the expiration date stamp indicates that the first version of the information resource has expired, then the first version of the information resource is determined not to be adequate.

If the first version of the information resource in local storage is determined not to be adequate (step 603), then processing proceeds to step 605. The receiver unit uses the resource identifier (for example, a URL of a trigger received in step 602) to retrieve a second version of the information resource from the Internet. In one example, the first version of the information resource and the second version of the information resource have identical URLs but the two versions have different meta-information expiration date stamps.

Next (step 606), information from the second version of the information resource is displayed on the receiver unit concurrently with the television video received from the broadcast communication channel.

If, on the other hand, the first version of the information resource in local storage is determined to be adequate (step 603), then processing proceeds to step 604 where information from the first version of the information resource is displayed concurrently with television video from the broadcast communication channel.

Figure 7:
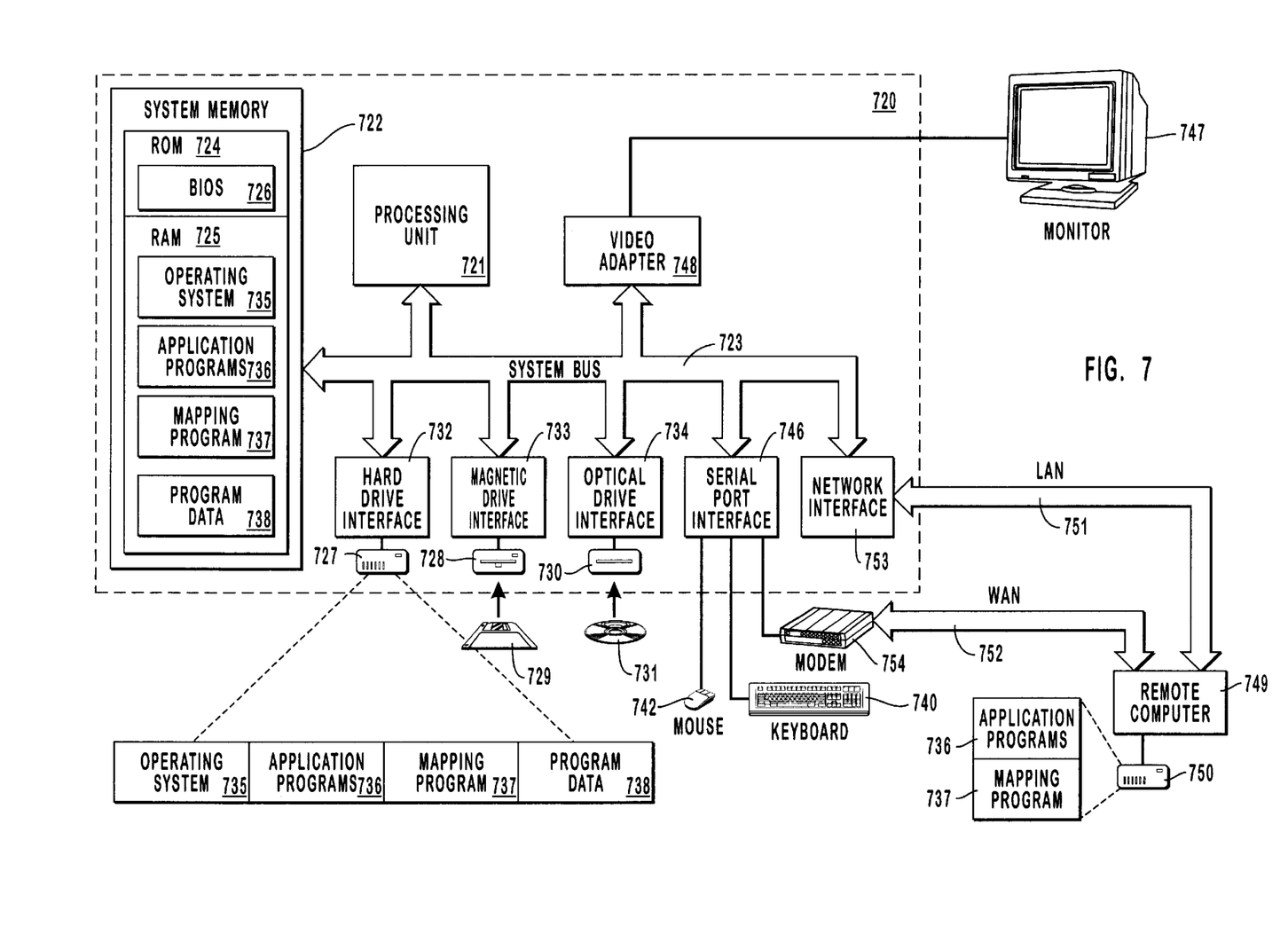
FIG. 7 is a block diagram of an exemplary operating environment for an embodiment of the present invention (such as, for example, WebTV® for Windows).

EXEMPLARY OPERATING ENVIRONMENT: FIG. 7 and the following discussion are intended to provide a brief, general description of a suitable computing environment in which the invention may be implemented. Although not required, aspects of the various embodiments are described in the general context of computer-executable instructions, such as program modules, being executed by a digital processor. The digital processor may, for example, be a part of a personal computer that executes program modules. Generally, program modules include routines, programs, objects, components, data structures, etc. that perform particular tasks or implement particular abstract data types. Moreover, those skilled in the art will appreciate that the invention may be practiced with other system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 7, an exemplary computing system for implementing the invention includes a general purpose computing device in the form of a conventional personal computer 720, including a processing unit 721, a system memory 722, and a system bus 723 that couples various system components including the system memory to the processing unit 721. The system bus 723 may be any of several types of bus structures, including a memory bus or memory controller, a peripheral bus, and a local bus using any of a variety of bus architectures. The system memory includes read only memory (ROM) 724 and random access memory (RAM) 725. A basic input/output system 726 (BIOS), containing the basic routines that help to transfer information between elements within the personal computer 720, such as during start-up, is stored in ROM 724. The personal computer 720 further includes a hard disk drive 727 for reading from and writing to a hard disk, not shown, a magnetic disk drive 728 for reading from or writing to a removable magnetic disk 729, and an optical disk drive 730 for reading from or writing to optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of computer readable instructions, data structures, program modules and other data for the personal computer 720. Although the exemplary environment described herein employs a hard disk, a removable magnetic disk 729 and a removable optical disk 731, it should be appreciated by those skilled in the art that other types of computer readable media which can store data that is accessible by a computer, such as magnetic cassettes, flash memory cards, digital video disks, Bernoulli cartridges, random access memories, read only memories, and the like, may also be used in the exemplary operating environment.

A number of program modules may be stored on the hard disk, magnetic disk 729, optical disk 731, ROM 724 or RAM 725, including an operating system 735, one or more application programs 736, other program modules 737, and program data 738. Web content including HTML files in compressed format or in uncompressed format may be stored on the hard disk 727. A user may enter commands and information into the personal computer 720 through input devices such as a keyboard 740 and pointing device 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port or a universal serial bus (USB). A monitor 747 or other type of display device is also connected to the system bus 723 via an interface, such as a video adapter 748. Web content and television video may be displayed concurrently on monitor 747 in some embodiments. In addition to the monitor, personal computers typically include other peripheral output devices (not shown), such as speakers and printers.

The personal computer 720 may operate in a networked environment using logical connections to one or more remote computers, such as a remote computer 749. The remote computer 749 may be another personal computer, a server, a router, a network PC, a peer device or other common network node, and typically includes many or all of the elements described above relative to the personal computer 720, although only a memory storage device 750 has been illustrated in FIG. 7. The logical connections depicted in FIG. 7 include a local area network (LAN) 751 and a wide area network (WAN) 752. Such networking environments are commonplace in offices, enterprise-wide computer networks, intranets and the Internet.

When used in a LAN networking environment, the personal computer 720 is connected to the local network 751 through a network interface or adapter 753. When used in a WAN networking environment, the personal computer 720 typically includes a modem 754 or other means for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. It will be appreciated that the network connections shown are exemplary and other means of establishing a communications link between the computers may be used.

Although the present invention is described in connection with certain specific embodiments for instructional purposes, the present invention is not limited thereto. Broadcast television formats other than the NTSC format can be employed including: the Phase Alternate Lines (PAL) format, the Sequential Couleur Avec Memoire (SECAM) format, and the High Definition Television (HDTV) or digital television format. The invention is applicable to both interlaced scanning systems and progressive scanning systems. Software that carries out steps of methods in accordance with the present invention can be stored on a computer-readable medium. Examples of computer-readable mediums include magnetic and optical storage media and semiconductor memory. Web page content can be stored in local storage under a filename (or name of another data structure) that does not include the actual resource identifier itself, but rather the resource identifier is usable to look up the filename (or name of another data structure) where the web page content is stored. An information resource can involve information other than HTML code. Audio data can be included in information resources so that dialog in a second language can be heard along with the television video in accordance with aspects of the present invention. The invention is applicable to numerous broadcast communication channels including radio, cable, digital packet networks, digital terrestrial television, high definition television (HDTV), and satellite broadcast channels. The broadcast communication channel can be a radio channel and the receiver unit can be a radio that is coupled to receive information resources from a packet-switched network. Information in information resources can be in any suitable form including HTML, XML, Java programs, audio data, and images. Accordingly, various modifications, adaptations, and combinations of various features of the described embodiments can be practiced without departing from the scope of the invention as set forth in the claims.

What is claimed is:

1. In a receiver unit, a method for increasing the likelihood that a referenced information resource is received, the method comprising:
   a. monitoring a broadcast communication channel for information resources, and if the information resource is received determining if the information resource is to be stored in local storage at the receiver unit;
   b. receiving a resource identifier from the broadcast communication channel that can be used to reference the information resource both at local storage and at a packet-switched network that is network connectable to the receiver unit;
   c. determining, based on the resource identifier, if the information resource is present in the local storage; and
   d. when it is determined that the information resource is not present in the local storage, then using the resource identifier to request the information resource from the packet-switched network.

2. The method of claim 1, wherein monitoring the broadcast communication channel comprises monitoring a one-way broadcast communication channel.

3. The method of claim 1, wherein monitoring the broadcast communication channel comprises monitoring a packet-switched network.

4. The method of claim 2, wherein the information resource is broadcast on the one-way broadcast communication channel but the information resource is not received by the receiver unit in step (a), and wherein the receiver unit retrieves the information resource from the packet-switched network in step (d).

5. The method of claim 2, wherein the information resource is not broadcast on the one-way broadcast communication channel.

6. The method of claim 2, wherein step (a) includes:
   the receiver unit determining if the information resource from the one-way broadcast communication channel is corrupted and if the information resource is corrupted the information resource is not stored in the local storage.

7. The method of claim 2, wherein the information resource is HTML code or XML code.

8. The method of claim 2, wherein a first information resource is stored in local storage in step (a), a first resource identifier that identifies the first information resource being received in step (b), it is determined that the first information resource is to be retrieved from local storage in step (c), and wherein a second information resource is not stored in local storage in step (a), a second resource identifier that identifies the second information resource being received in step (b), the second information resource being requested from the packet-switched network in step (d).

9. The method of claim 2, wherein the one-way broadcast communication channel has a first sub-channel and a second sub-channel, the first sub-channel having a higher bandwidth than the second sub-channel, the information resource being received over the first sub-channel, the resource identifier being received over the second sub-channel.

10. The method of claim 9, wherein the one-way broadcast communication channel involves an NTSC television signal, the NTSC television signal having a plurality of first vertical blanking interval (VBI) lines and one second VBI line, the information resource being received by the receiver unit from the first VBI lines, the resource identifier being received by the receiver unit from the second VBI line.

11. The method of claim 2, wherein the one-way broadcast communication channel is a television channel that is broadcast over airwaves.

12. The method of claim 2, wherein the one-way broadcast communication channel is a television channel that is received over a cable network.

13. The method of claim 2, wherein the one-way broadcast communication channel is a television channel that is received from a satellite.

14. The method of claim 2, wherein the resource identifier is a Uniform Resource Locator (URL).

15. The method of claim 2, wherein the packet-switched network is the Internet.

16. A method, comprising:
   a. receiving a resource identifier on a second sub-channel of a one-way broadcast communication channel, the one-way broadcast communication channel also having a first sub-channel, the first sub-channel being a higher speed communication sub-channel than the second sub-channel;
   b. determining, based on the resource identifier, if the information resource was received on the first sub-channel; and
   c. if the information resource was not received from the first sub-channel, then obtaining the information resource identified by the resource identifier from the Internet.

17. In a computer system having a first receiver unit and a second receiver unit, a method, comprising:
   a. receiving at the first receiver unit, web page content that was broadcast on a first sub-channel of a one-way broadcast television channel;
   b. receiving at both the first receiver unit and the second receiver unit, a resource identifier that was broadcast on a second sub-channel of the one-way broadcast television channel, wherein the resource identifier can be used to reference the web page content from local storage at the first receiver unit, from local storage at the second receiver unit, and from the Internet and
   c. at the second receiver unit, determining, based on the resource identifier received on the second sub-channel, that the web content broadcast on the first sub-channel was not received and using resource identifier to request the web page content from the Internet.

18. The method of claim 17, wherein the web page content is hypertext mark-up language (HTML) or extensible mark-up language (XML) code, and wherein the resource identifier is a Uniform Resource Locator (URL).

19. The method of claim 17, wherein television video is broadcast on the one-way broadcast television channel, and wherein both the first receiver unit and the second receiver unit display the web page content concurrently with the television video.

20. A receiver unit, comprising:
   means for receiving a web page content from a first sub-channel of a one-way broadcast communication channel, and for storing the web page content received from the first sub-channel in local storage on the receiver unit in association with a resource identifier, wherein the resource identifier can be used to reference the web page content from both local storage and from the Internet;

means for receiving the resoure identifier from a second sub-channel of the one-way broadcast communication channel, the first sub-channel being a higher speed sub-channel than the second sub-channel; and means for retrieving the web page content from the local storage according to the association between the web page content and the resource identifier if the web page content is present in local storage, and for using the resource identifier to retrieve the web page content from the Internet if the web page content is not present in local storage on the receiver.

21. The receiver unit of claim 20, wherein the web page content is hypertext mark-up language (HTML) code, wherein the resource identifier is a Uniform Resource Locator (URL) that identifies the web page content on the World Wide Web, and wherein the receiver unit receives the one-way broadcast communication channel over a cable, the receiver unit also retrieving the web page content from the Internet over the cable.

22. A system, comprising:

means for broadcasting an information resource on a first sub-channel of a one-way broadcast television channel, and for broadcasting a resource identifier on a second sub-channel of the one-way broadcast television channel, the first sub-channel being a higher speed sub-channel than the second sub-channel; and a receiver unit, comprising:
  local storage; and
  means for receiving the resource identifiers, which can be used to reference an information resource from both the local storage and from the Internet, from the second sub-channel, and for using the resource identifier to retrieve the information resource from the Internet if the information resource is not present in the local storage of the receiver unit, but for using the resource identifier to retrieve the information resource from the local storage if the information resource is present in the local storage of the receiver unit.

23. A computer program product, comprising a computer readable medium having computer-executable instructions for performing the steps of:

a. if a web page content is received at a receiver unit from a one-way broadcast communication channel, then obtaining the web page content from the broadcast communication channel and storing the web page content in local storage at the receiver unit;

b. receiving a resource identifier, which can be used to reference the web page content from both the local storage and the from the Internet, from the one-way broadcast communication channel;

c. if the web page content is present in the local storage, then using the resource identifier to retrieve the web page content from the local storage; and d. if the web page content is not present in the local storage, then using the resource identifier to retrieve the web page content from the Internet.

24. In a receiver unit, a method, comprising:

receiving a web page content on a first sub-channel of a one-way broadcast television channel, receiving a resource identifier on a second sub-channel of a one-way broadcast television channel, and receiving television video over the one-way broadcast television channel, wherein the resource identifier can be used to reference web page content from both local storage and from the Internet, the first sub-channel being a higher speed sub-channel than the second sub-channel;

recording the television video along with the resource identifier onto a magnetic medium; and playing back the television video from the magnetic medium and using the resource identifier stored on the magnetic medium to retrieve the web page content identified by the resource identifier from the Internet, and displaying the web page content along with the television video.

25. The method of claim 24, wherein the magnetic medium is a magnetic tape contained within a cassette.

26. The method of claim 24, wherein the magnetic medium is a magnetic tape of a VHS cassette.

27. In a receiver unit, a method, comprising:

receiving television video from a broadcast communication channel;

receiving a first version of an information resource from the broadcast communication channel and storing the information resource in local storage;

receiving a resource identifier from the broadcast communication channel, wherein the resource identifier can identify an information resource from both the local storage and from the Internet, such that the first version of the information resource in the local storage is identified by the resource identifier;

using the resource identifier to access the first version of the information resource from local storage;

determining whether the first version of the information resource has a characteristic;

if the first version of the information resource stored in the local storage is not determined to have the characteristic, then using the resource identifier to request a second version of the information resource from the Internet and displaying information from the second version of the information resource concurrently with the television video received from the broadcast communication channel; and if the first version of the information resource stored in the local storage is determined to have the characteristic, then displaying the first version of the information resource concurrently with the television video received from the broadcast communication channel.

28. The method of claim 27, wherein the first version of the information resource has a time stamp that is stored in the local storage, and wherein the step of determining whether the first version of the information resource stored in the local storage has a characteristic involves comparing the time stamp to a current time.

29. The method of claim 27, wherein the characteristic is having an expiration date stamp that has not expired.

30. The method of claim 27, wherein the first version of the information resource includes web content, wherein the second version of the information resource includes web content, and wherein the resource identifier is usable to locate both the first version of the information resource stored in the local storage as well as the second version of the information resource on the Internet.

* * * * *

UNITED STATES PATENT AND TRADEMARK OFFICE
CERTIFICATE OF CORRECTION

PATENT NO. : 6,571,392 B1　　　　　　　　　　　　　　　　　　　　　　　Page 1 of 1
DATED : May 27, 2003
INVENTOR(S) : Daniel J. Zigmond and Dean J. Blackketter It is certified that error appears in the above-identified patent and that said Letters Patent is hereby corrected as shown below:

Column 1,
Line 22, after "controls the electron beam" delete "-"
Line 38, after "synchronize" delete "."

Column 2,
Line 3, after "of the field are" delete "therefbre" and insert -- therefore --
Line 33, after "thirty-six" delete "."

Column 3,
Line 17, after "Locator" delete "*"
Line 30, after "content is to" insert -- be --

Column 8,
Line 52, after "changes are not" delete "successfuilly" and insert -- successfully --

Column 9,
Line 3, after "finer grain" delete "changes" and insert -- changes --
Line 5, after "In A Data" delete "SErvice" and insert -- Service --
Line 57, before "VBI lines" delete "aptures" and insert -- captures --
Line 58, before "does not capture" delete "enerally" and insert -- generally --

Column 14,
Line 34, after "channel" delete ";and" and insert -- and if so, using the resource identifier to retrieve the information resource from a local cache; and --

Column 15,
Line 57, after "storage and" delete "the"

Signed and Sealed this

Twenty-third Day of March, 2004

JON W. DUDAS
*Acting Director of the United States Patent and Trademark Office*